United States Patent
Gerbaulet et al.

(10) Patent No.: US 9,776,788 B2
(45) Date of Patent: Oct. 3, 2017

(54) BEVERAGE CAPSULE FOR CENTRIFUGAL EXTRACTION

(71) Applicant: Nestec S. A., Vevey (CH)

(72) Inventors: Arnaud Gerbaulet, Oye et Pallet (FR); Jean-Francois Tinembart, Yverdon (CH); Daniel Abegglen, Rances (CH); Bruno Bizet, Montbellet (FR); Nicolas Jean-Guy Bezet, Macon (FR)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/401,230

(22) PCT Filed: May 15, 2013

(86) PCT No.: PCT/EP2013/059976
§ 371 (c)(1),
(2) Date: Nov. 14, 2014

(87) PCT Pub. No.: WO2013/171238
PCT Pub. Date: Nov. 21, 2013

(65) Prior Publication Data
US 2015/0191302 A1    Jul. 9, 2015

(30) Foreign Application Priority Data
May 16, 2012 (EP) ..................... 12168209

(51) Int. Cl.
B65D 85/804 (2006.01)
A47J 31/06 (2006.01)
A47J 31/22 (2006.01)

(52) U.S. Cl.
CPC ...... B65D 85/8043 (2013.01); A47J 31/0684 (2013.01); A47J 31/22 (2013.01)

(58) Field of Classification Search
CPC .............. B65D 85/8043; B65D 85/804; B65D 85/8046; A47J 31/40; A47J 31/22
(Continued)

(56) References Cited

U.S. PATENT DOCUMENTS 5,265,517 A * 11/1993 Gilbert ...................... A23F 5/26
99/280
2007/0186784 A1 * 8/2007 Liverani ............. A47J 31/0668
99/295
(Continued)

FOREIGN PATENT DOCUMENTS

CH    WO 2012013556 A1 *  2/2012   ......... B65D 85/8043
WO       2008148601 A1    12/2008

OTHER PUBLICATIONS

International Search Report, mailed Jul. 17, 2013 in PCT/EP13/059976, filed May 15, 2013.
(Continued)

*Primary Examiner* — Michele L Jacobson
*Assistant Examiner* — Ericson M Lachica
(74) *Attorney, Agent, or Firm* — Dunlap Codding, P.C.

(57) ABSTRACT

Capsule (1) for the preparation of a beverage in a centrifugal extraction device (50) by feeding liquid in the capsule and rotating the capsule along a rotational axis (I) in the device to produce centrifugal forces on the liquid, wherein the capsule (1) comprises containment walls forming an interior cavity (2) containing beverage ingredients (3); said containment walls comprising a lid (4) and a side wall (5) extending substantially revolutionary around a central axis (I) and a peripheral flange (8) extending peripherally in radial direction to said axis (I), said flange (8) comprising an annular base (9) extending outwardly and a valve means (10) connected to said annular base, said valve means (10) extending in a direction (A) transversal to said radial direction (B) and being configured with at least one deflectable (Continued)

valve portion (11) which deflects for leaving a transversal passage upon the centrifugal pressure exerted by liquid flowing thereon when the capsule is rotated about the axis (I) during the centrifugal extraction wherein the peripheral flange (8) forms an extension part of the side wall (5) and is independent from said lid (4).

14 Claims, 9 Drawing Sheets

(58) Field of Classification Search
USPC ............... 426/77, 78, 79, 80, 81, 82, 83, 84; 99/295, 302 C
See application file for complete search history.

(56) References Cited

U.S. PATENT DOCUMENTS

| | | | |
|---|---|---|---|
| 2010/0173056 A1* | 7/2010 | Yoakim | A47J 31/22 426/433 |
| 2013/0125762 A1* | 5/2013 | Dogan | B65D 85/8043 99/295 |

OTHER PUBLICATIONS

Written Opinion of the International Search Report, mailed Jul. 17, 2013 in PCT/EP13/059976, filed May 15, 2013.

* cited by examiner

BEVERAGE CAPSULE FOR CENTRIFUGAL EXTRACTION

CROSS REFERENCE TO RELATED APPLICATIONS/INCORPORATION BY REFERENCE STATEMENT

This application is a national stage application under 35 USC §371 of International Application No. PCT/EP2013/059976, filed May 15, 2013; which claims benefit and priority under the Paris Convention of EPO Application No. 12168209.0, filed May 16, 2012. The entire contents of the above-referenced patent applications are hereby expressly incorporated herein by reference.

FIELD OF THE PRESENTLY DISCLOSED AND/OR CLAIMED INVENTIVE CONCEPT(S)

The presently disclosed and/or claimed inventive concept(s) relates to the field of portioned beverage using capsules for preparing a beverage in a beverage extraction device. The presently disclosed and/or claimed inventive concept(s) more particularly relates to an improved capsule and a method for preparing the beverage.

BACKGROUND

The preparation of a beverage by a capsule containing beverage ingredients is known. In general, the capsule is inserted in a beverage extraction device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with ingredients while creating a gradient of pressure of liquid in the receptacle; such pressure increasing gradually from the centre towards the periphery of the receptacle. As liquid traverses the ingredients, such as ground coffee, extraction of the food compounds takes place and a liquid extract is obtained that flows out at the periphery of the receptacle.

The term "capsule" refers to any flexible, rigid or semi-rigid packaging container containing beverage ingredients. Other synonyms to a capsule are: "pod", "pad", "cartridge" or "sachet". The capsule can be designed for a single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system and method for preparing a beverage from a capsule using centrifugation forces is described in the following documents: EP2210539, WO2008/148604, WO2008/148650, WO2008/148646, WO2008/148656 and WO2010/026045, WO 2008/148834, WO 2010/066705A1 and WO 2010/063644.

It is known to use a capsule in a beverage brewing device using centrifugation wherein a closing wall of the capsule is removed or perforated for enabling insertion of beverage extracting means.

In WO2008/148601, a capsule for use in a centrifugal extraction device is disclosed. The capsule comprises a lid and a body attached to the lid via a peripheral deflectable sealing means which opens by effect of the centrifugal effect to let the food liquid pass. The deflectable sealing means comprises at least one peripheral plastic lip engaged in a seat. A problem of such sealing means configuration lies in that the centrifugal forces exerted by the centrifuged liquid tend to separate the lid from the body of the capsule. In order to avoid this separation, the lid must be supported by a rotating part of the device while at the same time be given a sufficient flexibility at the periphery of the capsule to allow the sealing means to open for allowing release of the centrifuged beverage. Therefore, the beverage flow leaving the capsule is highly dependent on the mechanical closure forces exerted by the device on the capsule. In particular, the beverage flow can be hindered by flow restrictions due to the compressive forces of the device on the lid.

There is a need for providing a solution that alleviates this problem.

DETAILED DESCRIPTION

Figure 1:
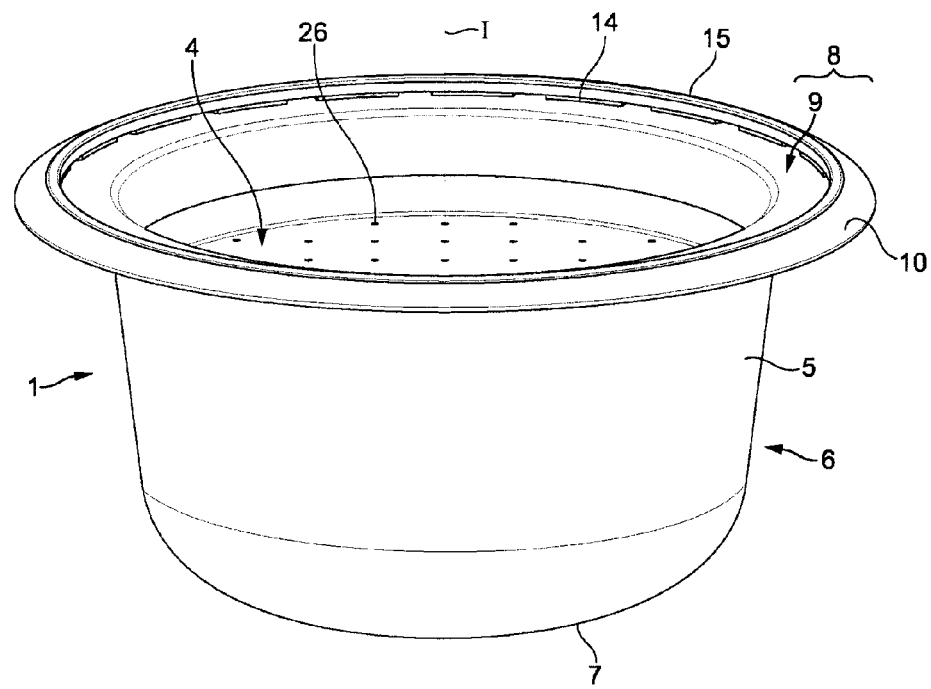
FIG. 1 is a perspective view of a capsule according to a first mode of the presently disclosed and/or claimed inventive concept(s)

In particular, the presently disclosed and/or claimed inventive concept(s) relates to a capsule for the preparation of a beverage in a centrifugal extraction device by feeding liquid in the capsule and rotating the capsule along a rotational axis in the device to produce centrifugal forces on the liquid, wherein the capsule comprises containment walls forming an interior cavity containing beverage ingredients; said containment walls comprising a lid and a side wall extending substantially revolutionary around a central axis and a peripheral flange extending peripherally in radial direction to said axis, said flange comprising an annular base extending outwardly and a valve section connected to said annular base, said valve section extending in a direction transversal to said radial direction and being configured with at least one deflectable valve portion which deflects for leaving a transversal passage upon the centrifugal pressure exerted by liquid flowing thereon when the capsule is rotated about the axis during the centrifugal extraction wherein the peripheral flange forms an extension part of the side wall and is independent from said lid.

Contrary to the prior art, the functioning of the valve or sealing device is independent from the closure forces exerted by the device on the capsule for preventing separation of the lid from rest of the capsule. This solution results in a better control of the flow of beverage leaving the capsule and, consequently, results in an improved mastering of the quality of the released beverage.

In a mode, the valve section is formed of a single annular portion extending continuously at the flange around the central axis capable of leaving a passage in a 360-degree radial direction upon the centrifugal pressure exerted by liquid during extraction.

In another mode, the valve section is formed of a plurality of discrete deflectable valve portions between portions of the annular base; said valve portions extending discontinuously at the flange around the central axis capable of leaving flow passages in multiple radial directions upon the centrifugal pressure exerted by liquid during extraction.

In particular, the deflectable valve portion or, respectively, each discrete deflectable valve portion terminates by a free deflectable edge. The valve portion or, respectively, each discrete valve portion may also terminate by a deflectable edge in engagement, at rest, with a surface or portion of the annular base.

In a mode, radial apertures are provided between the valve section and the annular base to allow the centrifuged liquid to flow through the flange towards the deflectable valve portion or, respectively, discrete valve portions.

For a greater flexibility and a better sealing to liquid, the valve portion or, respectively, each discrete portion may taper towards its free edge.

In a mode, the deflectable valve portion or, respectively, each deflectable discrete valve portion is made thinner than the annular base and/or is made of a softer or more flexible material than the material of the annular base, respectively, each portion of the annular base. In particular, the delectable valve portion or, respectively, each discrete deflectable valve portion can be made of rubber or TPE or be made of the same plastic or starch-based material than the annular base, respectively portions.

In another mode, the valve section is integrally formed with the annular base of the flange.

In a particular configuration of the presently disclosed and/or claimed inventive concept(s), the annular base portion forms a battlement structure forming radial through-passages for liquid between notches.

In another configuration, the annular base portion forms a battlement structure occupied or covered by deflectable valve portions.

The presently disclosed and/or claimed inventive concept(s) further relates to the use of a capsule as aforementioned in beverage extraction device in which the capsule is rotated around its central axis during extraction for the preparation of a beverage.

First and second modes of the capsule of the presently disclosed and/or claimed inventive concept(s) are illustrated in relation to FIGS. 1 to 5. The capsule 1 of the presently disclosed and/or claimed inventive concept(s) comprises containment walls forming an interior cavity 2. The cavity is sized to receive beverage ingredients 3 such as ground coffee powder. In certain particular, non-limiting embodiments, the containment walls comprise a lid 4 and a sidewall 5 extending substantially revolutionarily around a central axis I passing through the centre of the capsule. The sidewall can be part of a cup-shaped body 6 also including a bottom wall 7. A flange 8 is also provided which extends peripherally in substantially radial direction relative to the axis I when the capsule is viewed in cross section such as in FIG. 2, 3 or 4. The flange also extends annularly about the axis I when the capsule is viewed in top perspective view of FIG. 1. The lid comprises beverage outlets 26 located in the vicinity of the flange. Therefore, when the capsule is submitted to centrifugal forces, as will be explained later, extracted liquid forming the beverage is forced to leave the cavity through these outlets 26.

Figure 3:
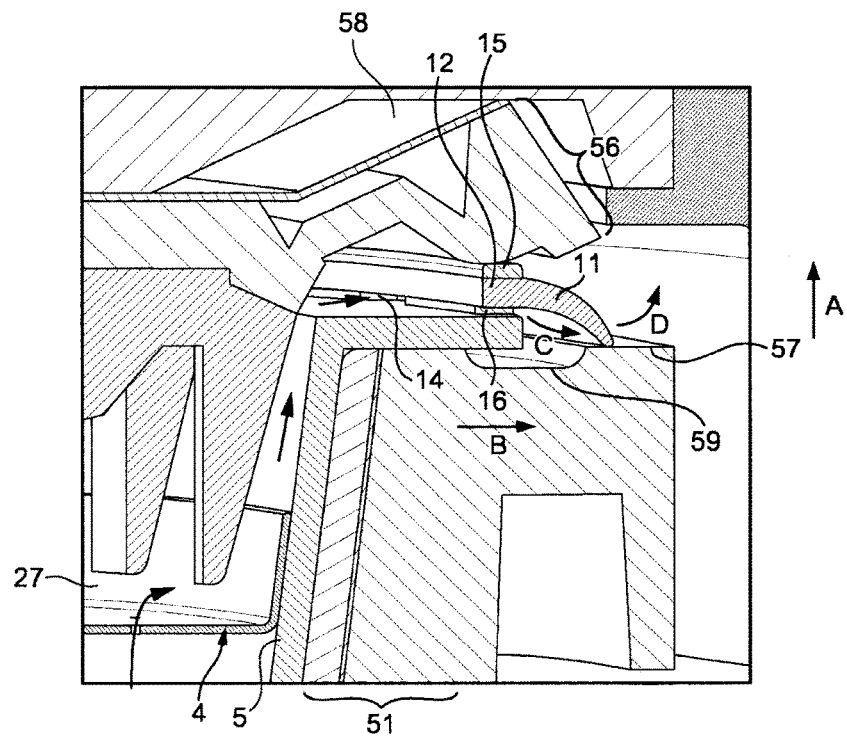
FIG. 3 shows a detail of the engagement of the capsule in the device according to the first mode.
Figure 4:
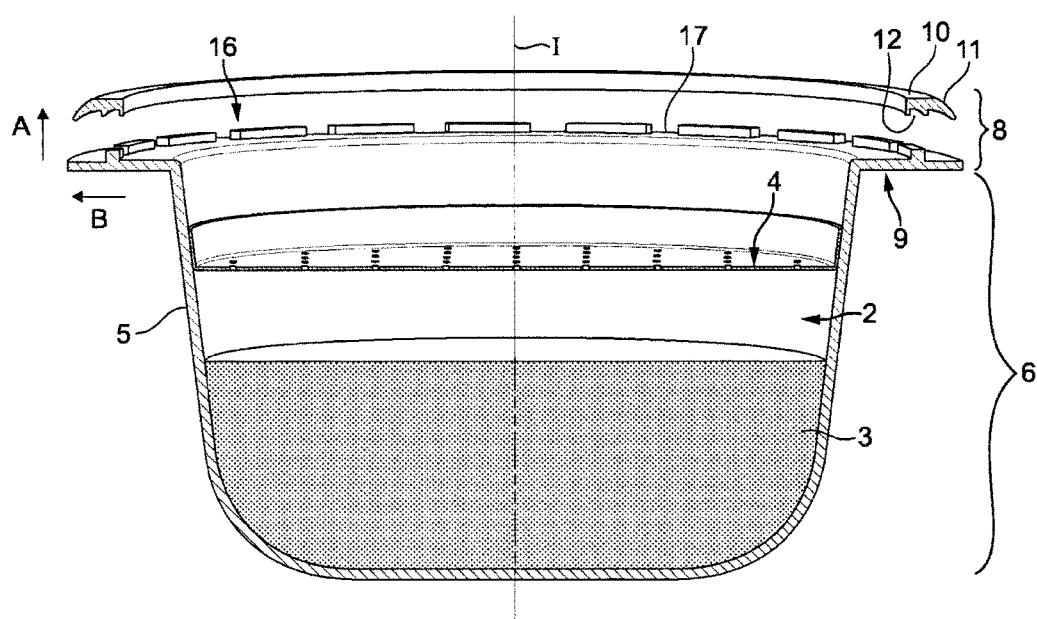
FIG. 4 is a cross-sectional view of a capsule according to a second mode of the presently disclosed and/or claimed inventive concept(s)

According to an aspect of the presently disclosed and/or claimed inventive concept(s), the flange 8 comprises an annular base 9 and a valve section 10. The valve section 10 is arranged at the flange to connect to the annular base 9. The valve section 10 is also arranged to extend at least in a direction A transversal to the radial direction B as illustrated in FIGS. 3 and 4. The valve section 10 is further configured with a deflectable valve portion 11. The deflectable valve portion 11 prolongs a connection portion 12 of the valve section 10 which connects the valve section 10 to the annular base 9. In certain particular, non-limiting embodiments, the deflectable portion tapers towards its free continuous edge.

As a general principle of the presently disclosed and/or claimed inventive concept(s), the flange 8 thereby forms an annular outwardly oriented extension of the side wall 5. Furthermore, the flange (and so the valve section too) is mechanically independent from the lid 4 since the lid is directly connected to the internal surface of the side wall and placed inset relative to the flange. As a result, an outer recess 27 is obtained. The lid may be sealed to the side wall such as by ultrasonic or thermal welding.

In the first mode of the capsule (FIGS. 1 to 3), the valve section 10 extends in radial direction B beyond the annular base 9. More particularly, the deflectable portion 11 extends outwardly beyond the base portion of the flange in order to seal against a portion of the capsule holder when the valve section 10 is in closure mode as will be explained later.

Furthermore, in certain particular, non-limiting embodiments, radial through-apertures 14 are provided between the valve section 10 and the annular base 9 of the flange. These apertures are meant to allow the beverage to flow through the flange during the centrifugal extraction. The annular base forms a battlement structure with a top annular ridge 15 extending continuously and delimiting with a plurality of joining wall portions 16 a plurality of through-apertures 14 extending in multiple radial directions and distributed all along the annular flange.

In such configuration, the valve section 10 can be connected to the annular base 9 by injection moulding of a plastic or thermoplastic elastomeric material (TPE). In certain particular, non-limiting embodiments, the valve section 10 is formed of a softer or more flexible material than the material of the annular base.

Figure 2:
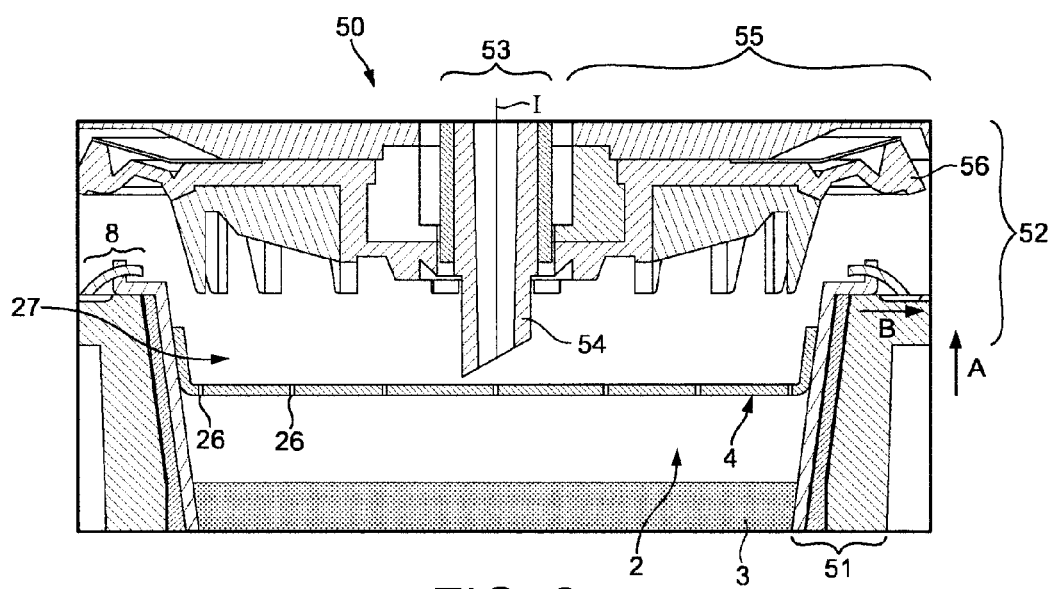
FIG. 2 shows a capsule in place in a beverage extraction device before closure by the liquid injection assembly of the device.

FIGS. 2 and 3 show the capsule of the first mode when in position in a centrifugal extraction device 50. The device typically comprises a rotating capsule holder 51 for placing the capsule in a stable position of reference in the device enabling a rotation of the capsule around the central axis I. The device further comprises a fluid interface assembly 52. The fluid interface assembly may take many various configurations. For example, it comprises a central liquid supply member 53 with a hollow needle 54 comprising a liquid conduit. The conduit is usually in communication with a liquid reservoir, a pump and a heater (not shown). The central liquid supply member 53 is mounted on an disc-shaped interface member 55. The interface member comprises a peripheral engaging portion 56 which is arranged for engaging against the flange 8 of the capsule when the fluid interface assembly 52 is engaged on the capsule holder with the capsule inserted there between. The interface member 55 is also arranged to rotate around axis I. For this, the interface member is mounted in rotation relative to a frame of the device (not shown). The liquid supply member 53 may be fixed or be mounted in rotational relationship with the frame. A driving system (not shown) is provided to drive these rotating parts of the device (capsule holder, fluid interface assembly) in rotation with the capsule. The driving system usually comprises a rotary motor.

FIG. 3 shows the system in engagement of the interface member 55 against the capsule when the capsule is positioned in the capsule holder. In such configuration, the hollow needle traverses the lid in such a manner that its liquid conduit communicates with the interior cavity 2 of the capsule. The deflectable valve portion 11 of the valve section 10 engages against an annular sealing portion 57 of the capsule holder. Depending on the relative dimensions between the flange of the capsule and the capsule holder, the valve portion 11 more or less deflects already when the flange of the capsule is engaged by the engaging portion 56 of the interface assembly. The engaging portion 56 may be provided with elastic biasing means 58 so that a certain compensation of the clearances is possible between the capsule and the device depending on the tolerance of the material constituting the capsule. However, it can be noticed that the function of the valve section 10 is not hindered by more than the degree of force necessary for maintaining the flange and capsule in position. Such force can be relatively moderate without affecting the work of the valve section 10. Therefore, the valve section 10 is given a great degree of freedom to be able to deflect relative to the capsule holder independently from the pressure exerted by the device on the capsule. The valve section 10 deflects as a result of the centrifugal forces of the beverage C acting on the interior of the deflectable portion 11. The forces of the beverage are obtained by rotating the capsule around axis I at relatively high rotational speed in the device during the centrifugal extraction. The valve portion will thus deflect in direction D as illustrated in FIG. 3 thereby forming a 360-degree passage between the end of the portion 11 of the flange and the sealing portion 57. An annular reservoir 59 for liquid can be provided upstream the sealing portion 57 in order to ensure a sufficient volume of liquid acting on the valve section 10. The three unlabeled arrows in FIG. 3 illustrate the flow of beverage during centrifugal extraction from the interior cavity 2 of the capsule through the outlets 26 of the lid 4 and through the apertures 14 distributed along the annular flange.

Figure 5:
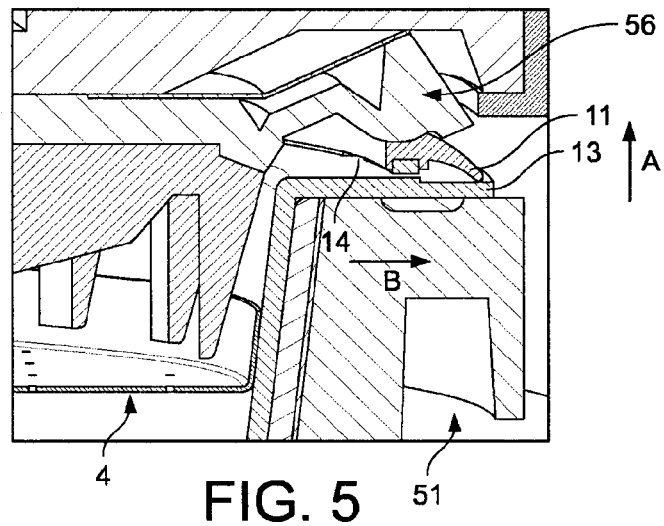
FIG. 5 shows a detail of the engagement of the capsule in the device according to the second mode.

In the alternative of the second mode (FIGS. 4 and 5), the valve section 10 does not extend in radial direction B beyond the annular base and its deflectable portion directly seals against a complementary support surface 13 of the annular base when the valve section 10 is in closure mode. The base portion forms a battlement structure comprising a plurality of notches 17 distributed annularly on the flange. The valve section 10 is formed of a single member with an annular connection portion 12 forming in cross section an inverted U shape and which fits over the joining portion 16 and delimiting the top edge of the notches 17. As a result, a plurality of radial passages or apertures 14 is formed enabling the flow of beverage to traverse the flange when the capsule is engaged in the device as illustrated in FIG. 5. The valve section 10 can be connected to the annular base 9 by injection moulding, gluing, welding, press-fitting or any other suitable technique. The valve section 10 can be made of a plastic, rubber or thermoplastic elastomeric material (TPE). Also, in certain embodiments, the valve section 10 is also formed of a softer or more flexible material than the material of the annular base.

Figure 6:
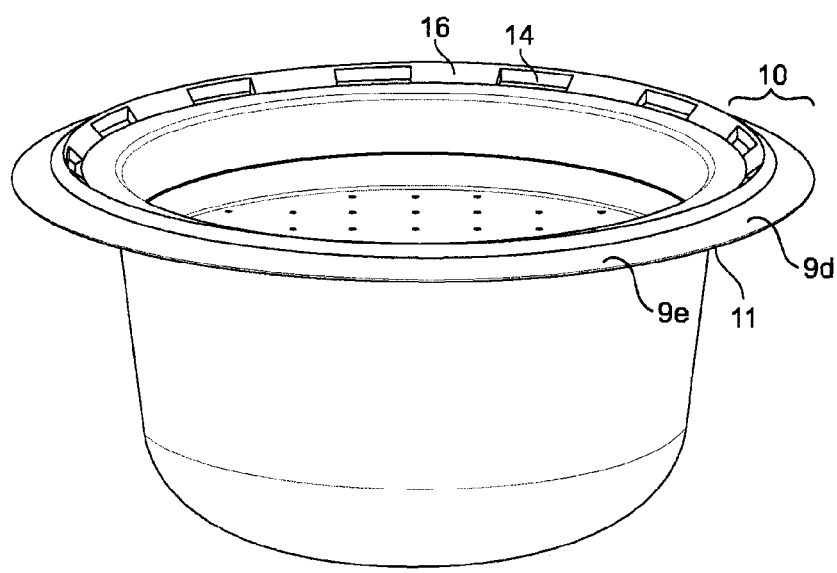
FIG. 6 is a perspective view of a capsule according to a third mode of the presently disclosed and/or claimed inventive concept(s)
Figure 7:
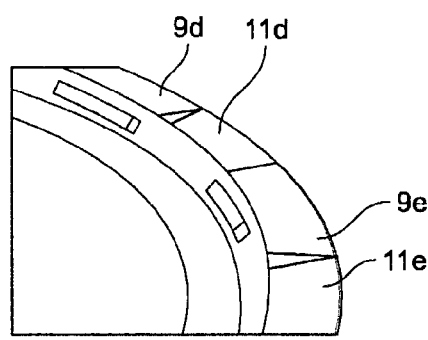
FIG. 7 is a detailed view in bottom perspective of a capsule according to FIG. 6.
Figure 8:
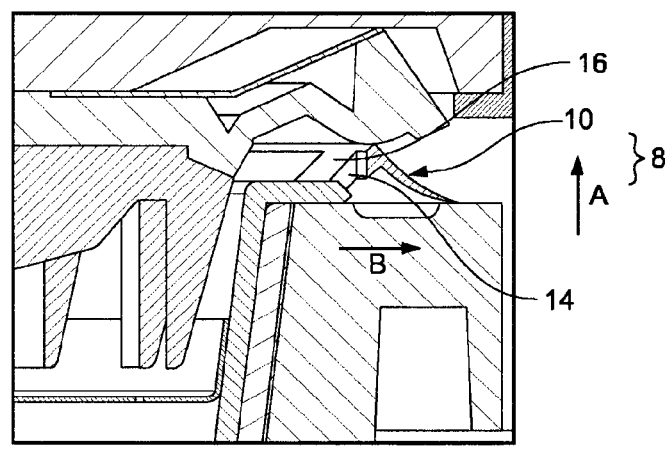
FIG. 8 shows a detail of the engagement of the capsule in the device according to the third mode.

FIGS. 6 to 8 illustrate a third mode of the capsule of the presently disclosed and/or claimed inventive concept(s) in which the valve section 10 is formed integrally with the annular base 9 of the flange. In particular, non-limiting embodiments, the valve section 10 forms an inverted V- or U-shape in transversal cross-section. In this case, radial apertures 14 are formed through the flange, in particular, through a joining wall portion 16 of the flange extending in axial direction A and joining the flat portion of the annular base to the valve section 10. The valve section 10 forms deflectable valve portions 11d, 11e separated by more rigid (non-deflectable) portions 9d, 9e. The deflectable portions 11d, 11e are formed by a lower thickness compared to the other portions 11d, 11e. This configuration enables to better control the deflection of the flange under the pressure exerted by the pressure of liquid, especially, in discrete areas of the flange distributed all along the periphery of the capsule. In certain particular, non-limiting embodiments, the flange is formed integrally of a relatively soft plastic, starch-based polymer or TPE. Additionally, in certain particular, non-limiting embodiments, the flange is formed in one piece with the body of the capsule. The increased flexibility of the deflectable portions 11d, 11e is obtained by a thickness of the portions which is smaller than the thickness of the other portions 9d, 9e.

Figure 9:
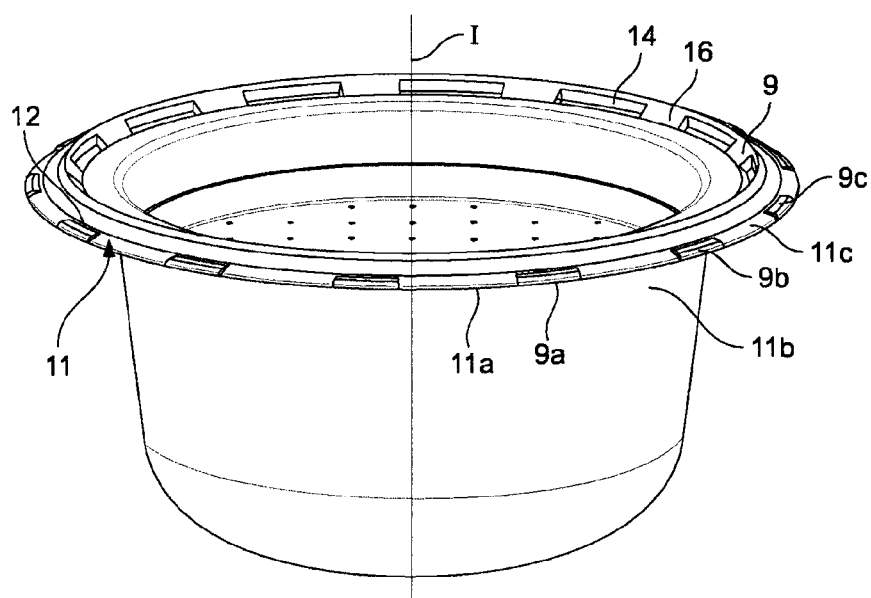
FIG. 9 is a perspective view of a capsule according to a fourth mode of the presently disclosed and/or claimed inventive concept(s)
Figure 10:
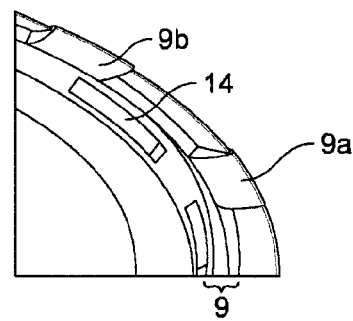
FIG. 10 is a detailed view in bottom perspective of a capsule according to FIG. 9.
Figure 11:
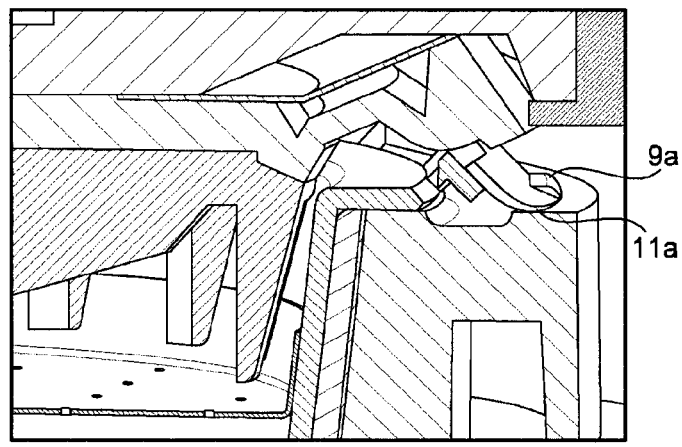
FIG. 11 shows a detail of the engagement of the capsule in the device according to the fourth mode.
Figure 12:
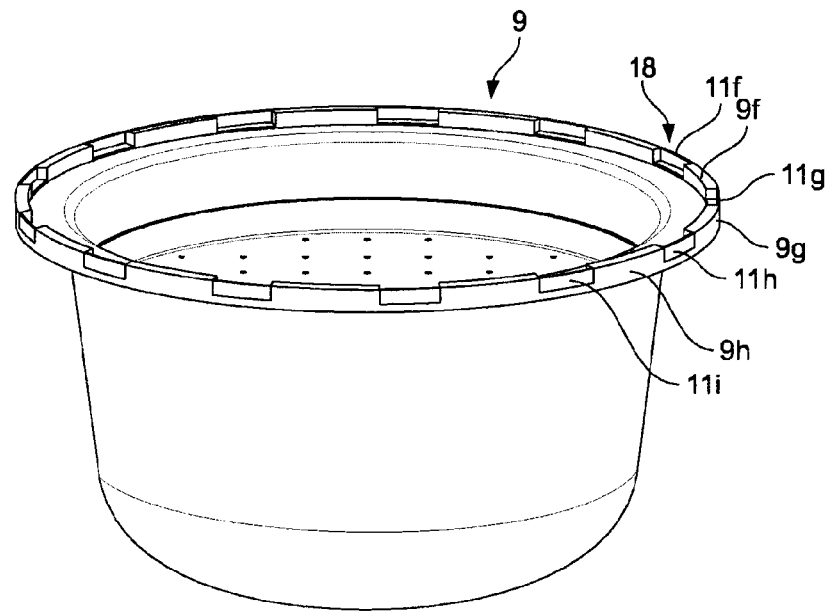
FIG. 12 is a perspective view of a capsule according to a fifth mode of the presently disclosed and/or claimed inventive concept(s)
Figure 13:
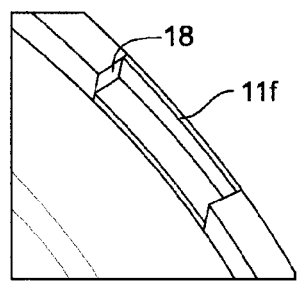
FIG. 13 is a detailed cross-sectional view in top perspective of a capsule according to FIG. 12.
Figure 14:
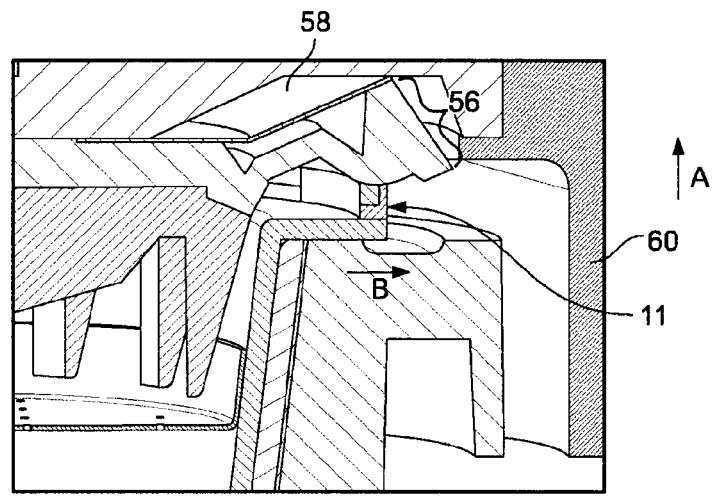
FIG. 14 shows a detail of the engagement of the capsule in the device according to the fifth mode.

FIGS. 9 to 11 illustrate a fourth mode of the capsule of the presently disclosed and/or claimed inventive concept(s) in which the valve section 10 is formed of a plurality of discrete valve portions 11a, 11b, 11c between more rigid, non-deflectable, portions 9a, 9b, 9c of the annular base 9. The valve portions 11a, 11b, 11c are distributed discontinuously at the flange around the central axis (I) for leaving flow passages in multiple radial directions when the portions deflect under the pressure the centrifuged beverage. The valve portions 11a, 11b, 11c extend, at the free end by soft tapered edges and, at the other end, by an annular continuous connection portion 12 made of the same material. The connection portion 12 connects the valve section 10 to the annular base 9 by any suitable means such as welding or over-moulding. Additionally, liquid flow through-apertures 14 are provided in the inner joining wall portion 16 of the annular base. In this mode, the valve section 10 and annular base are formed of two distinct materials; the material of the valve section 10 being softer than the material of the annular base. In certain particular, non-limiting embodiments, the material of the valve section 10 is TPE or rubber. Additionally, in certain particular, non-limiting embodiments, the material of the annular base is plastic or a biodegradable polymer such as starch. Therefore, in this mode, the deflection of the valve section 10 is obtained by a choice of softer material.

In a fifth mode of the capsule illustrated in FIGS. 12 to 15, the flange comprises an annular base 9 forming a battlement structure extending axially in direction A and perpendicular to the main direction of extension of the base 9. In particular, the battlement structure comprises a series of notches 18 distributed all along the periphery of the flange and delimited by rigid portions 9f, 9g, 9h forming crenels. Each notch is filled with a discrete valve portion 11f, 11g, 11h, 11i made of a softer and, in certain particular, non-limiting embodiments, thinner material. The upper edge of the valve portion thereby engages the engaging portion 56 of the device. The valve section 10 thereby form a valve system in conjunction with the engaging portion 56 of the fluid interface assembly of the device as apparent in FIG. 14. When the extraction takes place by rotation of the capsule at elevated rotational speed, liquid passing through the lid is pressurized by effect of centrifugation against the valve section 10 and provokes the deflection of the softer portions in outward direction B. Since the pressure threshold of the elastic biasing means 58 is higher than the pressure threshold of the valve section 10, the valve portions 11 will deflect outwardly when such pressure threshold is reached thereby leaving passages for the flow of liquid which then hits a collecting wall 60 of the device.

Figure 15:
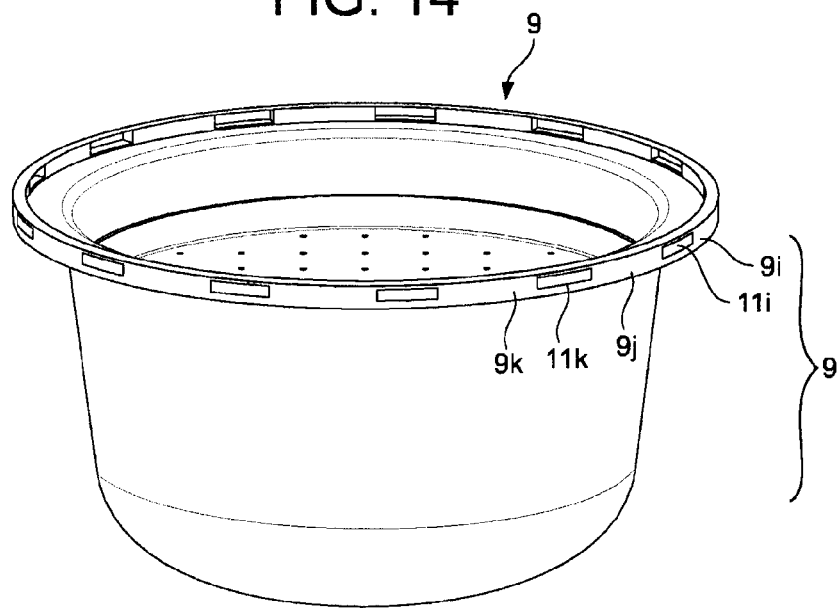
FIG. 15 is a perspective view of a capsule according to a sixth mode of the presently disclosed and/or claimed inventive concept(s)
Figure 16:
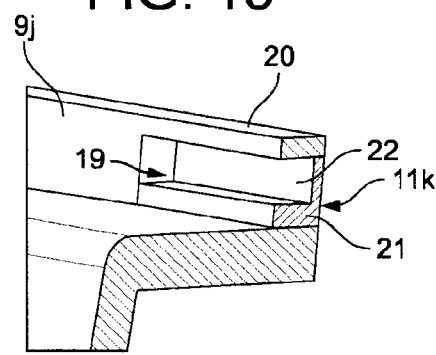
FIG. 16 is a detailed view of a capsule according to FIG. 15.
Figure 17:
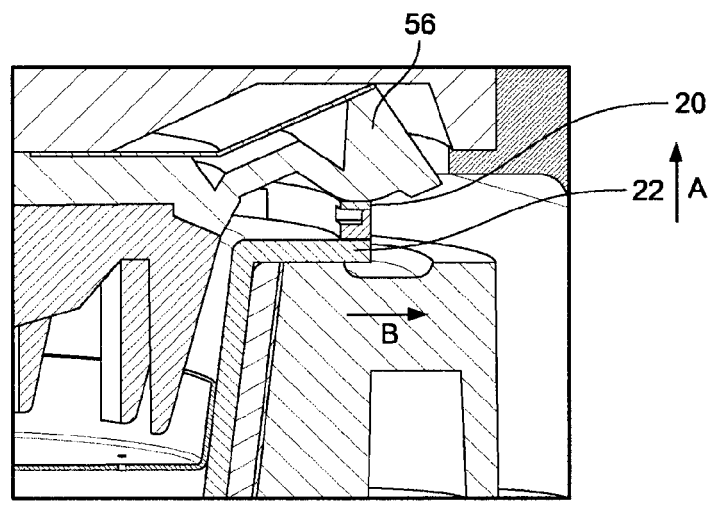
FIG. 17 shows a detail of the engagement of the capsule in the device according to the sixth mode.

In the sixth mode of FIGS. 15 to 17, the flange comprises a annular base 9 forming a battlement structure extending axially in direction A and perpendicular to the main direction of extension of the base 9. In particular, the battlement structure comprises instead of notches as in the previous embodiment, through-apertures 19 distributed all along the periphery of the flange and delimited by rigid portions 9i, 9j, 9k joining to a top annular ridge 20. The rigid portions 9i-9k and the ridge 20 are integrally formed with the annular base 9 such as in plastic material. The valve section 10 is formed by a plurality of softer valve portions 11j, 11k positioned in the through-apertures. The valve portions may be formed of a rigid connecting portion 21 affixed in the aperture 19 and a thinner soft membrane 22. The portions 21, 22 can be formed integrally of a same rubber or TPE material. As shown in FIG. 17, under the pressure of liquid, the membrane 22 will deflect outwardly in direction B to form a passage for the extracted liquid. The top ridge 20 serves as a rigid support for the engaging portion 56 of the device.

Figure 18:
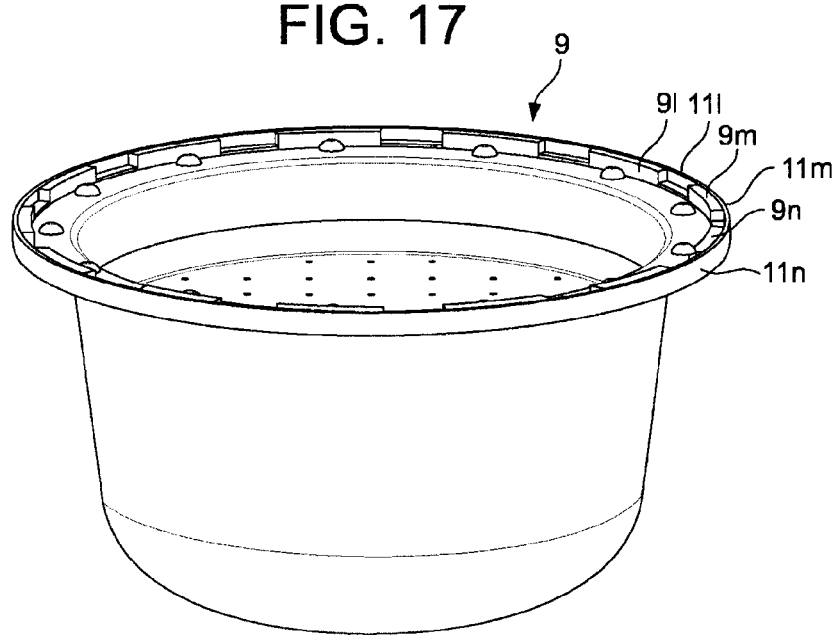
FIG. 18 is a perspective view of a capsule according to a seventh mode of the presently disclosed and/or claimed inventive concept(s)
Figure 19:
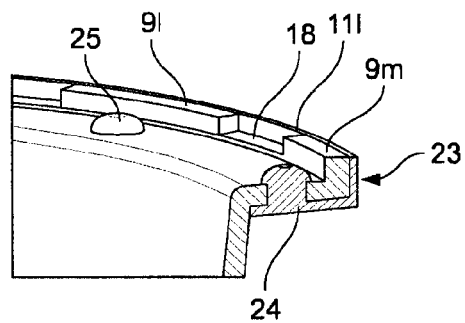
FIG. 19 is a detailed cross-sectional view of a capsule according to FIG. 18.
Figure 20:
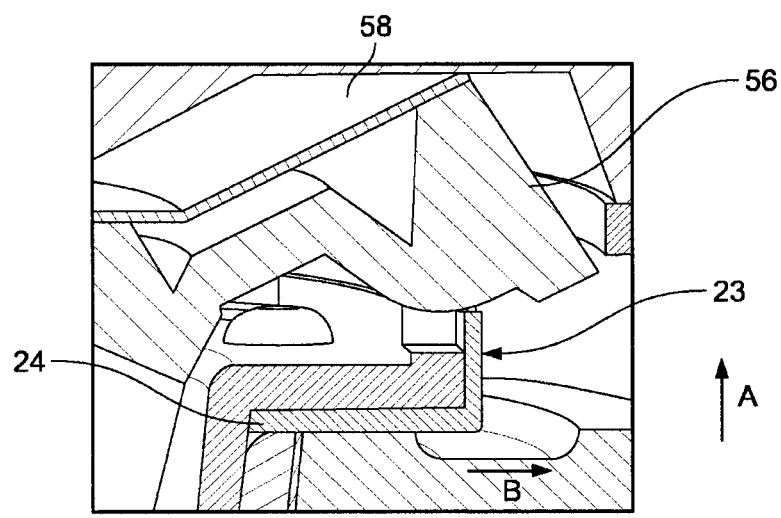
FIG. 20 shows a detail of the engagement of the capsule in the device according to the seventh mode.

FIGS. 18 to 20 illustrate a seventh mode of the capsule in which the flange comprises an annular base 9 forming a battlement structure extending axially in direction A and perpendicular to the main direction (or radial direction B) of extension of the base 9. In particular, the battlement structure comprises a series of notches 18 distributed all along the periphery of the flange and delimited by rigid portions 9l, 9m, 9n forming crenels. The valve section 10 is formed by a soft continuous annular band 23 surrounding the structure at its external side, thereby forming deflectable portions 11l, 11m, 11n in the areas of the band overlapping with the notches 18. The band 23 extends in radial direction B by a connection portion 24 provided with a plurality of connecting studs 25 traversing the annular base and ending by an enlarged retaining end. In certain particular, non-limiting embodiments, the valve section 10 is over-injected in TPE on a more rigid plastic base.

Figure 21:
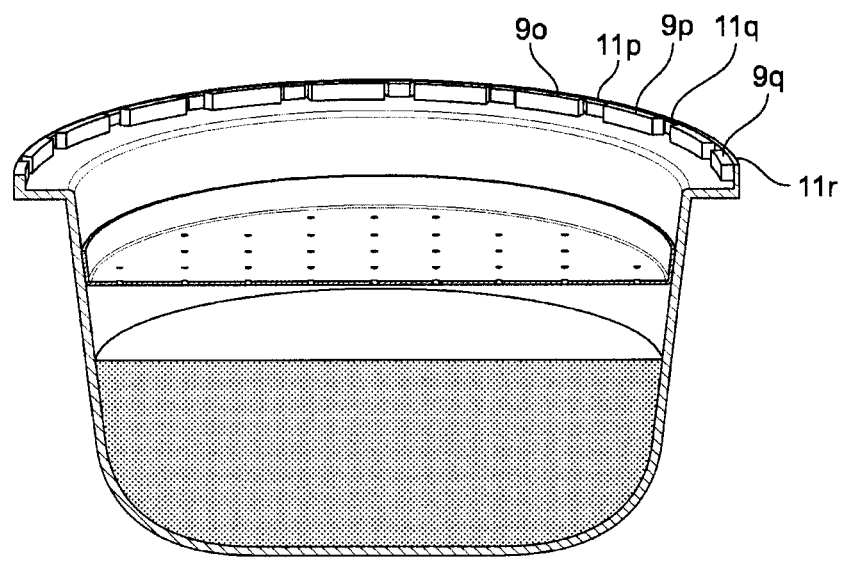
FIG. 21 is a cross-sectional view of a capsule according to an eighth mode of the presently disclosed and/or claimed inventive concept(s)
Figure 22:
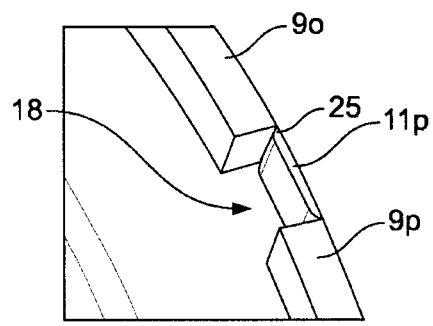
FIG. 22 is a detailed top view of a capsule according to FIG. 20.
Figure 23:
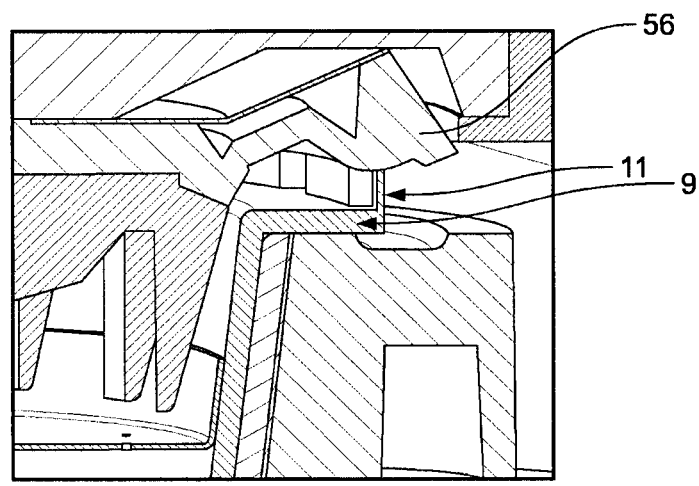
FIG. 23 shows a detail of the engagement of the capsule in the device according to the eighth mode.

In the eighth mode of the capsule of the presently disclosed and/or claimed inventive concept(s) illustrated in FIGS. 21 to 23, the flange comprises an annular base 9 forming a battlement structure extending axially in direction A and perpendicular to the main direction of extension of the base 9. In particular, the battlement structure comprises a series of notches 18 distributed all along the periphery of the flange and delimited by rigid portions 9o, 9p, 9q forming crenels. The valve section 10 is formed integrally with the annular base by thin a plurality of deflectable wall portions 11p, 11q, 11r joining two neighbouring crenels. The deflectable portions are thinner than the crenels and integrally formed with the crenels. Furthermore, fracture initiating portions 25 are provided for allowing the valve wall to deflect more largely. These fracture initiation portions 25 can be formed as a reduced thickness (e.g. grooves) of the deflectable portions at the junction line with the crenels.

The invention claimed is:

1. A capsule for the preparation of a beverage in a centrifugal extraction device by feeding liquid in the capsule and rotating the capsule along a rotational axis in the device to produce centrifugal forces on the liquid, wherein the capsule comprises containment walls forming an interior cavity containing beverage ingredients, said containment walls comprising:
   a side wall extending substantially revolutionary around a central axis;
   a lid connected to an internal surface of the side wall; and
   a peripheral flange extending peripherally in a radial direction relative to said central axis, said flange comprising:
      an annular base extending outwardly; and
      a valve section connected to said annular base, said valve section extending in a direction transversal to the radial direction and comprising at least one deflectable valve portion which deflects as a result of exertion of a centrifugal pressure by liquid flowing thereon when the capsule is rotated about the central axis during centrifugal extraction, whereby said deflection forms at least one flow passage through which the beverage flows out of the capsule, and wherein the at least one deflectable valve portion terminates by a deflectable edge in engagement, at rest, with a surface or portion of the annular base; and
   wherein the peripheral flange forms an extension part of the side wall and is independent from said lid, and wherein the lid is placed inset relative to the peripheral flange.

2. The capsule of claim 1, wherein the lid comprises beverage outlets located in a vicinity of the peripheral flange.

3. The capsule of claim 1, wherein the lid is connected to the internal surface of the side wall below an upper edge of the side wall.

4. The capsule of claim 1, wherein the valve section is formed of a plurality of discrete deflectable valve portions between portions of the annular base, wherein said valve portions extend discontinuously at the flange around the central axis and are capable of deflecting to form a plurality of flow passages in multiple radial directions upon the exertion of centrifugal pressure by liquid during extraction.

5. The capsule of claim 4, wherein the annular base forms a battlement structure forming radial through-passages that allow for liquid to flow between notches.

6. The capsule of claim 1, wherein the valve section is formed of a single deflectable valve portion extending continuously at the flange around the central axis and being capable of deflecting to form a passage in a 360-degree radial direction upon the exertion of centrifugal pressure by liquid during extraction.

7. The capsule of claim 6, wherein the valve section is integrally formed with the annular base of the flange.

8. The capsule of claim 6, wherein at least one of:
(a) the at least one deflectable valve portion is made thinner than the annular base; and
(b) the at least one deflectable valve portion is made of a softer or more flexible material than a material from which the annular base is made.

9. The capsule of claim 8, wherein the at least one deflectable valve portion is made of rubber or thermoplastic elastomeric material (TPE).

10. The capsule of claim 8, wherein the annular base and the at least one deflectable valve portion are both made of a same plastic or starch-based material.

11. The capsule of claim 8, wherein the annular base forms a battlement structure occupied or covered by a plurality of deflectable valve portions.

12. The capsule of claim 11, wherein each valve portion is connected to the battlement structure by fracture initiating portions for allowing greater deflection of the valve section compared to a capsule without fracture initiating portions.

13. The capsule of claim 12, wherein the lid and side wall form together an outer recess.

14. A method for preparing a beverage, comprising the steps of:
inserting the capsule of claim 1 containing beverage ingredients into a beverage extraction device;
feeding liquid into the capsule;
rotating the capsule around the central axis thereof, whereby centrifugal force causes the liquid to interact with the beverage ingredients disposed in the capsule, thereby forming an extract, and whereby the centrifugal force also causes the at least one deflectable valve portion to deflect and form at least one flow passage through which a liquid extract can flow; and
collecting liquid extract obtained from the capsule.

* * * * *